US008678905B2

(12) United States Patent
Aligizakis et al.

(10) Patent No.: US 8,678,905 B2
(45) Date of Patent: Mar. 25, 2014

(54) METHODS AND SYSTEMS FOR CONDUCTING LOTTERY GAMES WITH PORTABLE DEVICES ENABLED FOR NEAR FIELD COMMUNICATION (NFC)

(71) Applicant: Intralot S.A.—Integrated Lottery Systems and Services, Athens (GR)

(72) Inventors: Ioannis Aligizakis, Athens (GR); Dimitrios Kakos, Halandri (GR); Spiridon Pachnis, Vrilisia (GR); Konstantinos Angelos Vrahatis, Athens (GR); Chrysoula Athanasopoulou, Athens (GR); Argiris Diamandis, Athens (GR); Gianna Karra, Athens (GR)

(73) Assignee: Intralot S.A.—Integrated Lottery Systems and Services, Athens (GR)

( * ) Notice: Subject to any disclaimer, the term of this patent is extended or adjusted under 35 U.S.C. 154(b) by 0 days.

(21) Appl. No.: 13/781,536

(22) Filed: Feb. 28, 2013

(65) Prior Publication Data

US 2013/0267297 A1 Oct. 10, 2013

Related U.S. Application Data

(60) Provisional application No. 61/604,060, filed on Feb. 28, 2012.

(51) Int. Cl.

| | |
|---|---|
| ***A63F 9/24*** | (2006.01) |
| ***A63F 13/00*** | (2006.01) |
| ***G06F 17/00*** | (2006.01) |
| ***G06F 19/00*** | (2011.01) |

(52) U.S. Cl.
USPC ............................................ 463/17; 463/40

(58) Field of Classification Search
USPC ........................ 463/1, 16–20, 25, 29, 40–42; 705/14.1–14.73
See application file for complete search history.

(56) References Cited

U.S. PATENT DOCUMENTS

| | | | | |
|---|---|---|---|---|
| 8,475,275 | B2 * | 7/2013 | Weston et al. | 463/39 |
| 2004/0033833 | A1 * | 2/2004 | Briggs et al. | 463/42 |

(Continued)

FOREIGN PATENT DOCUMENTS

| | | | |
|---|---|---|---|
| DE | 10 2008 027347 | A1 | 12/2009 |
| WO | 2009/127928 | A2 | 10/2009 |

(Continued)

OTHER PUBLICATIONS

International Search Report and Written Opinion issued in connection with International Appln. No. PCT/IB2013/001014 dated Aug. 16, 2013.

*Primary Examiner* — Milap Shah
(74) *Attorney, Agent, or Firm* — Greenberg Traurig, LLP

(57) ABSTRACT

In some embodiments, the instant invention provides for a computer system that includes a processor executing the code to: receive an indication indicating that a player desires to participate in a lottery game based on a near field communication (NFC) between a mobile device of the player and a first game piece associated with the lottery game conducted by a game conducting authority; conduct a drawing in accordance with rules of the lottery game; receive an indication identifying an action performed by the player in accordance with the rules of the lottery game where the action is based on: i) a result of the drawing and ii) NFC communication between the mobile device of the player and a second game piece associated with the lottery game; and distribute a prize to player in accordance with the rules of the lottery game.

20 Claims, 5 Drawing Sheets

(56) References Cited

U.S. PATENT DOCUMENTS

| | | | | |
|---|---|---|---|---|
| 2004/0077423 | A1* | 4/2004 | Weston et al. | 472/137 |
| 2004/0182918 | A1* | 9/2004 | Meehan | 235/31 R |
| 2005/0266907 | A1* | 12/2005 | Weston et al. | 463/1 |
| 2006/0258433 | A1* | 11/2006 | Finocchio et al. | 463/16 |
| 2007/0167224 | A1* | 7/2007 | Sprogis | 463/29 |
| 2008/0014966 | A1* | 1/2008 | Chakraborty et al. | 455/456.4 |
| 2008/0268904 | A1 | 10/2008 | Tanaka | |
| 2010/0093435 | A1* | 4/2010 | Glaser et al. | 463/36 |
| 2011/0058516 | A1 | 3/2011 | Small et al. | |
| 2011/0244964 | A1* | 10/2011 | Glynne-Jones et al. | 463/40 |
| 2011/0306399 | A1* | 12/2011 | Erickson | 463/17 |
| 2012/0032396 | A1 | 2/2012 | Erickson | |
| 2012/0077584 | A1* | 3/2012 | Sarmenta | 463/31 |
| 2012/0077593 | A1* | 3/2012 | Sarmenta | 463/40 |
| 2013/0072280 | A1* | 3/2013 | Yacenda | 463/17 |
| 2013/0217333 | A1* | 8/2013 | Sprigg et al. | 455/41.2 |
| 2013/0267297 | A1* | 10/2013 | Aligizakis et al. | 463/17 |

FOREIGN PATENT DOCUMENTS

| | | | |
|---|---|---|---|
| WO | 2010/129245 | A2 | 11/2010 |
| WO | 2010/131629 | A1 | 11/2010 |

* cited by examiner

METHODS AND SYSTEMS FOR CONDUCTING LOTTERY GAMES WITH PORTABLE DEVICES ENABLED FOR NEAR FIELD COMMUNICATION (NFC)

RELATED APPLICATIONS

This application claims the priority of U.S. provisional application Ser. No. 61/604,060, entitled "METHODS AND SYSTEMS FOR CONDUCTING LOTTERY GAMES WITH PORTABLE DEVICES ENABLED FOR NEAR FIELD WIRELESS COMMUNICATION (NFC)," filed on Feb. 28, 2012, which is incorporated herein by reference in its entirety for all purposes.

TECHNICAL FIELD

In some embodiments, the present invention relates to conducting lottery games with portable devices enabled for communication utilizing NFC.

BACKGROUND

Typically, NFC can represent a short-range wireless communications technology in which NFC-enabled devices are "swiped," "bumped," "tap" or otherwise moved in close proximity to communicate. Typically, NFC could include a set of short-range wireless technologies, typically, requiring a distance of 10 cm or less. Usually, NFC operates at 13.56 MHz on ISO/IEC 18000-3 air interface and at rates ranging from 106 kbit/s to 424 kbit/s. Typically, NFC can involve an initiator and a target; the initiator actively generates a radio frequency (RF) field that can power a passive target. In such example, NFC targets are enabled to take very simple form factors such as tags, stickers, key fobs, or cards that do not require batteries.

SUMMARY OF INVENTION

In some embodiments, the instant invention provides for a computer-implemented method that at least includes the following steps: specifically programming at least one computer system of a game conducting authority to perform at least the following: receiving at least one first indication indicating that at least one first player desires to participate in at least one first lottery game, where the at least one first indication is received based, at least in part on, at least one first near field communication (NFC) between a first mobile device of the at least one first player and at least one first game piece associated with the at least one first lottery game conducted by the game conducting authority; communicating with the first mobile device of the at least one first player to verify an identity of the at least one first player by the game conducting authority; receiving, from the first mobile device of the at least one first player, at least one first payment for playing the at least one first lottery game by the at least one first player; conducting at least one first drawing by the game conducting authority in accordance with at least one first rule of the at least one first lottery game; receiving at least one second indication identifying at least one first action performed by the at least one first player in accordance with at least one second rule of the at least one first lottery game conducted by the game conducting authority, where the at least one first action is based, at least in part, on: i) a result of the at least one first drawing by the game conducting authority, and ii) at least one second NFC between the first mobile device of the at least one first player and at least one second game piece associated with the at least one first lottery game conducted by the game conducting authority; distributing at least one first prize to the at least one first player in accordance with at least one third rule of the at least one first lottery game; receiving at least one third indication indicating that at least one second player desires to participate in the at least one first lottery game, where the at least one second indication is received based, at least in part on, at least one second NFC between a second mobile device of the at least one second player and at least one third game piece associated with the at least one first lottery game conducted by the game conducting authority; communicating with the second mobile device of the at least one second player to verify an identity of the at least one second player by the game conducting authority; receiving, from the second mobile device of the at least one second player, at least one second payment for playing the at least one first lottery game by the at least one second player; conducting at least one second drawing by the game conducting authority in accordance with the at least one first rule of the at least one first lottery game; receiving at least one forth indication identifying at least one second action performed by the at least one second player in accordance with the at least one second rule of the at least one first lottery game conducted by the game conducting authority, where the at least one second action is based, at least in part, on: i) a result of the at least one second drawing by the game conducting authority, and ii) at least one fourth NFC between the second mobile device of the at least one second player and the at least one fourth game piece associated with the at least one first lottery game conducted by the game conducting authority; and distributing at least one second prize to the at least one second player in accordance with the at least third rule of the at least one first lottery game.

In some embodiments, the at least one first and the at least one second drawings are among a plurality of players of the at least one first lottery game. In some embodiments, the at least one first and the at least one second drawings are the same. In some embodiments, the at least one first and the at least one third game pieces are the same. In some embodiments, the at least one first and the at least one third game pieces are the same. In some embodiments, the at least one second and the at least one fourth game pieces are the same.

In some embodiments, the at least one first lottery games is selected from the group of: a treasure hunt type game, a Hot Spot type game, and a lotto type game.

In some embodiments, the at least one first action performed by the at least one first player and the at least one second action performed by the at least one second player of the player further based on the at least one first player and the at least one second player jointly playing the at least one first lottery games. In some embodiments, the at least one first prize is a first portion of at least one third prize and the at least one second prize is a second portion of the at least one third prize.

In some embodiments, the instant invention provides for a computer-implemented method that at least includes the following steps: specifically programming at least one computer system of a game conducting authority to perform at least the following: receiving at least one first indication indicating that at least one first player desires to participate in at least one first lottery game, where the at least one first indication is received based, at least in part on, at least one first near field communication (NFC) between a first mobile device of the at least one first player and at least one first game piece associated with the at least one first lottery game conducted by the game conducting authority; communicating with the first mobile device of the at least one first player to verify an identity of the at least one first player by the game conducting authority; receiving, from the first mobile device of the at least one first player, at least one first payment for playing the at least one first lottery game by the at least one first player; receiving at least one third indication indicating that at least one second player desires to participate in the at least one first lottery game, where the at least one second indication is received based, at least in part on, at least one second NFC between a second mobile device of the at least one second player and at least one third game piece associated with the at least one first lottery game conducted by the game conducting authority; communicating with the second mobile device of the at least one second player to verify an identity of the at least one second player by the game conducting authority; receiving, from the second mobile device of the at least one second player, at least one second payment for playing the at least one first lottery game by the at least one second player; conducting at least one first drawing by the game conducting authority in accordance with at least one first rule of the at least one first lottery game; receiving at least one second indication identifying at least one first action performed by the at least one first player in accordance with at least one second rule of the at least one first lottery game conducted by the game conducting authority, where the at least one first action is based, at least in part, on: i) a result of the at least one first drawing by the game conducting authority, and ii) at least one second NFC between the first mobile device of the at least one first player and at least one second game piece associated with the at least one first lottery game conducted by the game conducting authority; receiving at least one forth indication identifying at least one second action performed by the at least one second player in accordance with the at least one second rule of the at least one first lottery game conducted by the game conducting authority, where the at least one second action is based, at least in part, on: i) the result of the at least one first drawing by the game conducting authority, and ii) at least one fourth NFC between the second mobile device of the at least one second player and the at least one fourth game piece associated with the at least one first lottery game conducted by the game conducting authority; and distributing at least one first prize to the at least one first player in accordance with at least one third rule of the at least one first lottery game; and distributing at least one second prize to the at least one second player in accordance with the at least third rule of the at least one first lottery game.

In some embodiments, the instant invention provides for a computer system that includes at least the following components: at least one computer having a non-transient computer tangible readable medium having stored thereon software instructions executable by at least one processor of the computer that include at least the following code: code to receive at least one first indication indicating that at least one first player desires to participate in at least one first lottery game, where the at least one first indication is received based, at least in part on, at least one first near field communication (NFC) between a first mobile device of the at least one first player and at least one first game piece associated with the at least one first lottery game conducted by the game conducting authority; code to communicate with the first mobile device of the at least one first player to verify an identity of the at least one first player by the game conducting authority; code to receive, from the first mobile device of the at least one first player, at least one first payment for playing the at least one first lottery game by the at least one first player; code to conduct at least one first drawing by the game conducting authority in accordance with at least one first rule of the at least one first lottery game; code to receive at least one second indication identifying at least one first action performed by the at least one first player in accordance with at least one second rule of the at least one first lottery game conducted by the game conducting authority, where the at least one first action is based, at least in part, on: i) a result of the at least one first drawing by the game conducting authority, and ii) at least one second NFC between the first mobile device of the at least one first player and at least one second game piece associated with the at least one first lottery game conducted by the game conducting authority; code to distribute at least one first prize to the at least one first player in accordance with at least one third rule of the at least one first lottery game; code to receive at least one third indication indicating that at least one second player desires to participate in the at least one first lottery game, where the at least one second indication is received based, at least in part on, at least one second NFC between a second mobile device of the at least one second player and at least one third game piece associated with the at least one first lottery game conducted by the game conducting authority; code to communicate with the second mobile device of the at least one second player to verify an identity of the at least one second player by the game conducting authority; code to receive, from the second mobile device of the at least one second player, at least one second payment for playing the at least one first lottery game by the at least one second player; code to conduct at least one second drawing by the game conducting authority in accordance with the at least one first rule of the at least one first lottery game; code to receive at least one forth indication identifying at least one second action performed by the at least one second player in accordance with the at least one second rule of the at least one first lottery game conducted by the game conducting authority, where the at least one second action is based, at least in part, on: i) a result of the at least one second drawing by the game conducting authority, and ii) at least one fourth NFC between the second mobile device of the at least one second player and the at least one fourth game piece associated with the at least one first lottery game conducted by the game conducting authority; and code to distribute at least one second prize to the at least one second player in accordance with the at least third rule of the at least one first lottery game.

In some embodiments, the instant invention provides for a computer system that includes at least the following components: at least one computer having a non-transient computer tangible readable medium having stored thereon software instructions executable by at least one processor of the computer that include at least the following code: code to receive at least one first indication indicating that at least one first player desires to participate in at least one first lottery game, where the at least one first indication is received based, at least in part on, at least one first near field communication (NFC) between a first mobile device of the at least one first player and at least one first game piece associated with the at least one first lottery game conducted by the game conducting authority; code to communicate with the first mobile device of the at least one first player to verify an identity of the at least one first player by the game conducting authority; code to receive, from the first mobile device of the at least one first player, at least one first payment for playing the at least one first lottery game by the at least one first player; code to receive at least one third indication indicating that at least one second player desires to participate in the at least one first lottery game, where the at least one second indication is received based, at least in part on, at least one second NFC between a second mobile device of the at least one second player and at least one third game piece associated with the at least one first lottery game conducted by the game conducting authority; code to communicate with the second mobile device of the at least one second player to verify an identity of the at least one second player by the game conducting authority; code to receive, from the second mobile device of the at least one second player, at least one second payment for playing the at least one first lottery game by the at least one second player; code to conduct at least one first drawing by the game conducting authority in accordance with at least one first rule of the at least one first lottery game; code to receive at least one second indication identifying at least one first action performed by the at least one first player in accordance with at least one second rule of the at least one first lottery game conducted by the game conducting authority, where the at least one first action is based, at least in part, on: i) a result of the at least one first drawing by the game conducting authority, and ii) at least one second NFC between the first mobile device of the at least one first player and at least one second game piece associated with the at least one first lottery game conducted by the game conducting authority; code to receive at least one forth indication identifying at least one second action performed by the at least one second player in accordance with the at least one second rule of the at least one first lottery game conducted by the game conducting authority, where the at least one second action is based, at least in part, on: i) the result of the at least one first drawing by the game conducting authority, and ii) at least one fourth NFC between the second mobile device of the at least one second player and the at least one fourth game piece associated with the at least one first lottery game conducted by the game conducting authority; and code to distribute at least one first prize to the at least one first player in accordance with at least one third rule of the at least one first lottery game; and code to distribute at least one second prize to the at least one second player in accordance with the at least third rule of the at least one first lottery game.

BRIEF DESCRIPTION OF THE DRAWINGS

The present invention will be further explained with reference to the attached drawings, wherein like structures are referred to by like numerals throughout the several views. The drawings shown are not necessarily to scale, with emphasis instead generally being placed upon illustrating the principles of the present invention. Further, some features may be exaggerated to show details of particular components.

The figures constitute a part of this specification and include illustrative embodiments of the present invention and illustrate various objects and features thereof. Further, the figures are not necessarily to scale, some features may be exaggerated to show details of particular components. In addition, any measurements, specifications and the like shown in the figures are intended to be illustrative, and not restrictive. Therefore, specific structural and functional details disclosed herein are not to be interpreted as limiting, but merely as a representative basis for teaching one skilled in the art to variously employ the present invention.

DETAILED DESCRIPTION

Among those benefits and improvements that have been disclosed, other objects and advantages of this invention will become apparent from the following description taken in conjunction with the accompanying figures. Detailed embodiments of the present invention are disclosed herein; however, it is to be understood that the disclosed embodiments are merely illustrative of the invention that may be embodied in various forms. In addition, each of the examples given in connection with the various embodiments of the invention are intended to be illustrative, and not restrictive.

Throughout the specification and claims, the following terms take the meanings explicitly associated herein, unless the context clearly dictates otherwise. The phrases “in one embodiment” and “in some embodiments” as used herein do not necessarily refer to the same embodiment(s), though it may. Furthermore, the phrases “in another embodiment” and “in some other embodiments” as used herein do not necessarily refer to a different embodiment, although it may. Thus, as described below, various embodiments of the invention may be readily combined, without departing from the scope or spirit of the invention.

In addition, as used herein, the term “or” is an inclusive “or” operator, and is equivalent to the term “and/or,” unless the context clearly dictates otherwise. The term “based on” is not exclusive and allows for being based on additional factors not described, unless the context clearly dictates otherwise. In addition, throughout the specification, the meaning of “a,” “an,” and “the” include plural references. The meaning of “in” includes “in” and “on.”

Illustrative Operating Environments

Figure 1:
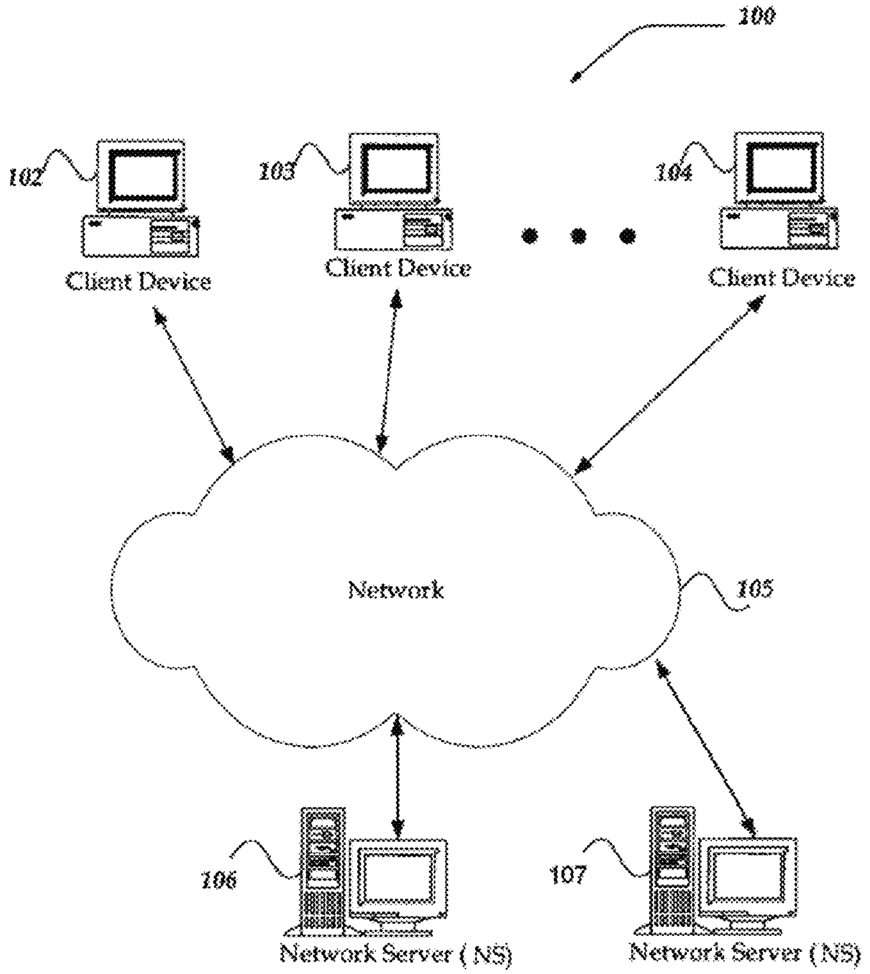
FIG. 1 illustrates some aspects of some embodiments of the instant invention.

FIG. 1 illustrates one embodiment of an environment in which the present invention may operate. However, not all of these components may be required to practice the invention, and variations in the arrangement and type of the components may be made without departing from the spirit or scope of the invention. In some embodiment, the inventive system for conducting a game hosts a large number of members and concurrent transactions. In other embodiments, the inventive system for conducting a game is based on a scalable computer and network architecture that incorporates varies strategies for assessing the data, caching, searching, and database connection pooling. An example of the scalable architecture is an architecture that is capable of operating multiple servers.

In embodiments, members of the inventive computer system 102-104 (e.g. user (e.g. players, agents, etc.) include virtually any computing device capable of receiving and sending a message over a network, such as network 105, to and from another computing device, such as servers 106 and 107, each other, and the like. In embodiments, the set of such devices includes devices that typically connect using a wired communications medium such as personal computers, multiprocessor systems, microprocessor-based or programmable consumer electronics, network PCs, and the like. In embodiments, the set of such devices also includes devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile device, and the like. Similarly, in embodiments, client devices 102-104 are any device that is capable of connecting using a wired or wireless communication medium such as a PDA, POCKET PC, wearable computer, and any other device that is equipped to communicate over a wired and/or wireless communication medium.

In embodiments, each member device within member devices 102-104 may include a browser application that is configured to receive and to send web pages, and the like. In embodiments, the browser application may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, JavaScript, and the like. In embodiments, the invention is programmed in either Java or .Net.

In embodiments, member devices 102-104 may be further configured to receive a message from the another computing device employing another mechanism, including, but not limited to email, Short Message Service (SMS), Multimedia Message Service (MMS), instant messaging (IM), internet relay chat (IRC), mIRC, Jabber, and the like.

In embodiments, network 105 may be configured to couple one computing device to another computing device to enable them to communicate. In embodiments, network 105 may be enabled to employ any form of computer readable media for communicating information from one electronic device to another. Also, in embodiments, network 105 may include a wireless interface, and/or a wired interface, such as the Internet, in addition to local area networks (LANs), wide area networks (WANs), direct connections, such as through a universal serial bus (USB) port, other forms of computer-readable media, or any combination thereof. In embodiments, on an interconnected set of LANs, including those based on differing architectures and protocols, a router may act as a link between LANs, enabling messages to be sent from one to another.

Also, in some embodiments, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, in some embodiments, remote computers and other related electronic devices could be remotely connected to either LANs or WANs via a modem and temporary telephone link. In essence, in some embodiments, network 105 includes any communication method by which information may travel between client devices 102-104, and servers 106 and 107.

Figure 2:
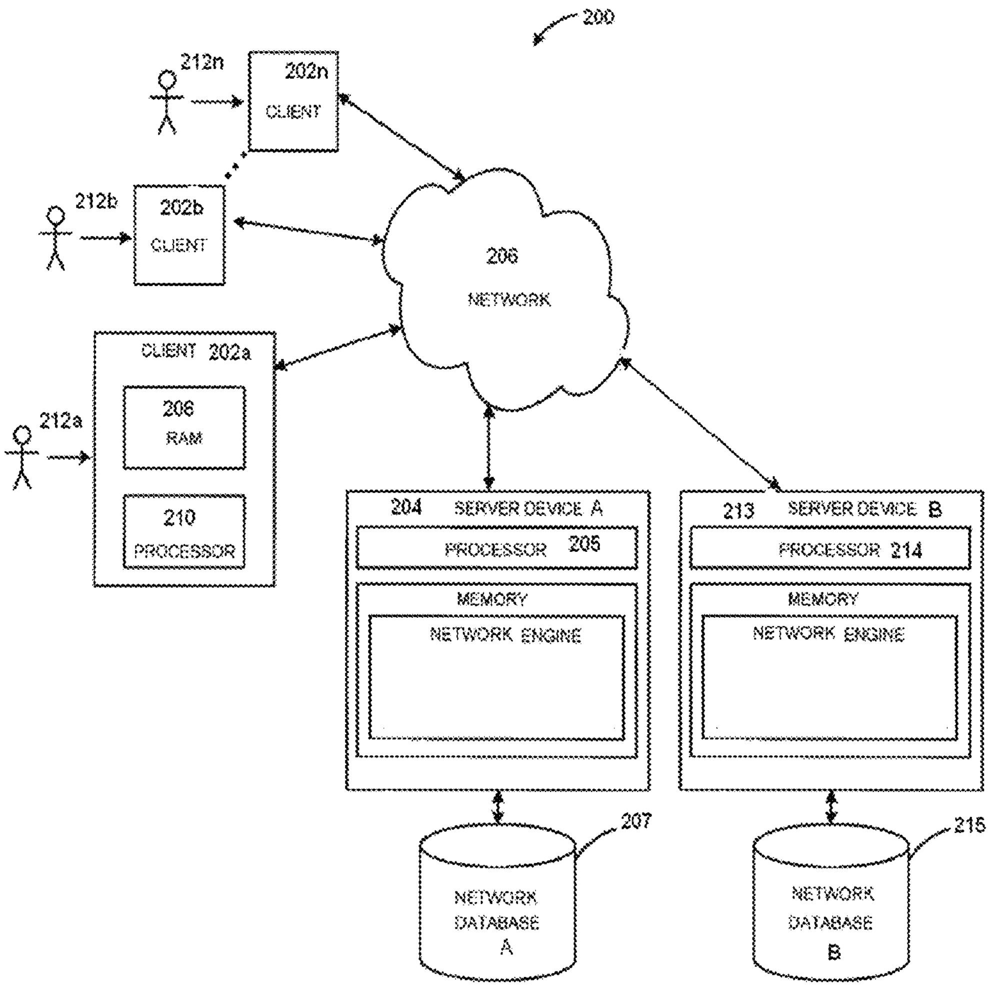
FIG. 2 illustrates some other aspects of some embodiments of the instant invention.

FIG. 2 shows another exemplary embodiment of the computer and network architecture that supports the inventive system for conducting a game. The member devices 202*a*, 202*b* thru 202*n* shown (e.g., lottery terminals, players' personal electronic devices) each at least includes a computer-readable medium, such as a random access memory (RAM) 208 coupled to a processor 210 or FLASH memory. The processor 210 may execute computer-executable program instructions stored in memory 208. Such processors comprise a microprocessor, an ASIC, and state machines. Such processors comprise, or may be in communication with, media, for example computer-readable media, which stores instructions that, when executed by the processor, cause the processor to perform the steps described herein. Embodiments of computer-readable media may include, but are not limited to, an electronic, optical, magnetic, or other storage or transmission device capable of providing a processor, such as the processor 210 of client 202*a*, with computer-readable instructions. Other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. The instructions may comprise code from any computer-programming language, including, for example, C, C++, C#, Visual Basic, Java, Python, Perl, and JavaScript. Member devices 202*a-n* may also comprise a number of external or internal devices such as a mouse, a CD-ROM, DVD, a keyboard, a display, or other input or output devices.

Examples of client devices 202*a-n* may be personal portable computers, digital assistants, personal digital assistants, cellular phones, mobile phones, smart phones, pagers, digital tablets, laptop computers, Internet appliances, and other processor-based devices. In general, a client device 202*a* can be any type of processor-based platform that is connected to a network 206 and that interacts with one or more application programs. Client devices 202*a-n* may operate on any operating system capable of supporting a browser or browser-enabled application, such as Microsoft™, Windows™, or Linux. The client devices 202*a-n* shown may include, for example, personal computers executing a browser application program such as Microsoft Corporation's Internet Explorer™, Apple Computer Inc.'s Safari™, Mozilla Firefox, and Opera. Through the client devices 202*a-n*, users (e.g. players, agents, etc.) 212*a-n* communicate over the network 206 with each other and with other systems and devices coupled to the network 206. As shown in FIG. 2, server devices 204 and 213 may be also coupled to the network 206.

In some embodiments, the term "mobile electronic device" may refer to any portable electronic device that may or may not be enabled with location tracking functionality. For example, a mobile electronic device can include, but is not limited to, a mobile phone, Personal Digital Assistant (PDA), Blackberry™, Pager, Smartphone, or any other reasonable mobile electronic device. For ease, at times the above variations are not listed or are only partially listed, this is in no way meant to be a limitation.

In some embodiments, the terms "proximity detection," "locating," "location data," "location information," and "location tracking" as used herein may refer to any form of location tracking technology or locating method that can be used to provide a location of a mobile electronic device, such as, but not limited to, at least one of location information manually input by a user, such as, but not limited to entering the city, town, municipality, zip code, area code, cross streets, or by any other reasonable entry to determine a geographical area; Global Positions Systems (GPS); GPS accessed using Bluetooth™; GPS accessed using any reasonable form of wireless and/or non-wireless communication; WiFi™; server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed, this is in no way meant to be a limitation.

In some embodiments, NFC peer-to-peer communication can be conducted when a plurality of NFC-enable device within close proximity of each other. In some embodiments, NFC tags can contain data and be read-only or rewriteable. In some embodiment, NFC tags can be custom-encoded. In some embodiments, NFC tags and/or NFC-enabled device (e.g., smart phones with NFC capabilities, either embedded or peripheral) can securely store personal data such as debit and credit card information, loyalty program data, PINs and networking contacts, among other information. In another embodiments, such personal data could be stored externally in a personal space on the Central Processor where excess could be granted to a specific client.

In some embodiments, lottery data may also be communicated using any wireless means of communication, such as 4G, 3G, GSM, GPRS, WiFi, WiMax, and other remote local or remote wireless communication using information obtained via the interfacing of a wireless NFC enabled mobile device to a smart poster. In some embodiments, the term "wireless communications" includes communications conducted at ISO 14443 and ISO 18092 interfaces. In some embodiments, the communications between player's NFC-enabled smart device and lottery provided equipment (e.g., terminals, POS, POE, Hosts) is performed, for example, in accordance with the ISO 14443A/B standard and/or the ISO 18092 standard.

In some embodiments, player's NFC-enabled smart device and/or lottery provided equipment (e.g., terminals, POS, POE, Hosts) can include one or more additional transceivers (e.g., radio, Bluetooth, and/or WiFi transceivers) and associated antennas, and enabled to communicate with each other by way of one or more mobile and/or wireless protocols.

In some embodiments, NFC tags can include one or more integrated circuits.

In some embodiments, player's NFC-enabled smart device may include a cellular transceiver coupled to the processor and receiving a cellular network timing signal. In some embodiments, player's NFC-enabled smart device may further include a satellite positioning receiver coupled to the processor and receiving a satellite positioning system timing signal, and the processor may accordingly be configured to synchronize the internal timing signal to the satellite positioning system timing signal as the external timing signal. In some embodiments, the processor of player's NFC-enabled smart device may be configured to synchronize the internal timing signal to the common external system timing signal via the NFC circuit. In some embodiments, NFC-enabled devices could have NFC technology embedded in them or through attached peripherals, such as, but not limited to, NFC-enabled sim card, smartphone case, etc.

In some embodiments, player's NFC-enabled smart device may include a power source, an NFC circuit configured to wirelessly communicate using an NFC communications protocol, and a processor coupled to the power source and the NFC circuit. In some embodiments, the processor of player's NFC-enabled smart device may be configured to synchronize an internal timing signal to an external timing signal, cycle power to the NFC circuit to periodically switch the NFC circuit between a peer-to-peer recognition state and a low power state based upon the synchronized internal timing signal, and initiate peer-to-peer NFC communications with another NFC device when in range thereof and upon being simultaneously switched to the peer-to-peer recognition state therewith.

In some embodiments, player's NFC-enabled smart device may include a related physical computer-readable medium and may have computer-executable instructions for causing player's NFC-enabled smart device to initiating peer-to-peer NFC communications with another NFC device when in range thereof and upon being simultaneously switched to the peer-to-peer recognition state therewith.

In some embodiments, the processor of player's NFC-enabled smart device may be configured for communicating wireless voice and data via a cellular transceiver via a cellular communications network. By way of example, the data communications may include, but not limited to, email messages, Web data, etc. In some embodiments, player's NFC-enabled smart device may in addition (or instead) include other types of wireless communications circuits capable of transmitting voice or other data, such as a wireless LAN, WiMAX, etc., circuit. In some embodiments, the processor of player's NFC-enabled smart device may proceed directly to communicate with the trusted NFC device, and in the case of a "smart poster" NFC device (e.g., SLP/SLS), such as one configured to pass a Uniform Resource Locator (URL), the processor may automatically direct a browser application thereof to the URL without prompting for permission to proceed to the designated location.

Illustrative Examples for Conducting and Participating in Lottery Games

Example 1

Traditional Lottery Games (Individual Play)

In some embodiments, lottery games of the present invention are conducted utilizing NFC-enabled devices that can include, but are not limited to, one or more Smart Lottery Poster (SLP) or a Smart Lottery Spot ("SLS") having one or more wireless tags ("NFC tags"). In some embodiments, NFC tagged spots (SLP, SLS) can be in one or more of the following formats or other: wall posters, street posters, POS (point of service locations), terminals, newspapers, magazines, NFC-enabled TV, etc.

In some embodiments, players' NFC-enabled mobile devices selectively recognize only certain NFC tagged spots (SLP, SLS or other NFC-tagged spots in cooperation with the Lottery Host) and disregard others (e.g., NFC tagged spots belonging to a particular retailer), through system configuration In some embodiments, NFC tagged spots must be entered in the lottery host system.

In some embodiments, players' NFC-enabled devices must enable mobile client tracking and push notification service. Both functions serve the purpose of allowing the lottery host system to acknowledge and notify the player of a near-by NFC-enabled device.

In some embodiments, one or more NFC tags can be arranged on a SLP in a particular grid arrangement. In some embodiments, the NFC tags can be overlaid with an artistic drawing, so that, for example, on top of each tag one corresponding lottery game indicia, e.g. number, is shown. In some embodiments, each NFC tag can be assigned the lottery indicia, e.g. shown over it on the overlay. In some embodiments, the NFC tags (and therefore their respective indicia, e.g.

numbers) can be arranged in an orderly manner on the grid, for example following a numeric order.

In some embodiments, a potential player of lottery, who owns an NFC-enabled personal device (mobile phone, PDA, tablet etc) and wishes to participate in a lottery game, can walk up to a NFC-enabled device, e.g. SLP, and select their lottery participation options by bringing the NFC device in a proximity to (or tap on) the desired indicia, e.g. number(s), on the SLP, one by one. In some embodiments, this action can be repeated for as many indicia, e.g. numbers, as desired. In some embodiments, during the process of communicating with the SLS, the NFC-enabled device will interrogate for the proximity of an NFC tag, and, if a tag is detected, the tag is interrogated about its number assignment. In some embodiments, the NFC tag can respond with a lottery indicia, e.g. number, assigned to it and the device can store the tag responses (and therefore the player selections) using a software programmed to receive and communicate information utilizing NFC protocols. In some embodiments, a set of selected numbers can be used to create an electronic lottery play slip which can then be transferred to a lottery conducting agency for validation, using, for example, an electronic message, or a barcode formed on the device screen, or any other suitable technologies.

In some embodiments, an exemplary game can begin when a player finds a Game Poster (SLP/SLS) with multiple NFC tags on it. In other embodiments, the Lottery Host may send a notification to the potential players when they near a SLP with instruction to the location and/or information of the game and promotional actions, such as discount on participation cost, free participation, etc.

In some embodiments, in the next step, the player can, for example, tap on one tag (starting point) to generate a Bingo (or other lottery game) entry (e.g., for the purpose of the Bingo based example, the board may contain 25 numbers on a 5×5 table) on the Game poster and/or on a screen of portable device (e.g., smart phone, iPAD.) In some embodiments, the smart poster (SLP) can have multiple NFC tags (e.g., 75 NFC tags for the purposes of the Bingo based example, representing equal amount of indicia (e.g. numbers, arranged in random or orderly manner), for the player to select the necessary amount of indicia (25 for the Bingo example) to participate in the game.

In some embodiments, the player can change the entry by tapping again on the same, or other, NFC tag.

When satisfied by table, in some embodiments, the player can pay (registered or not) to participate in the game.

In some embodiments, the player may wait for the lottery host to conduct the draw determining the winning combination. In other embodiments, the player can be asked to tap on different tags to reveal the winning numbers to match with their own up to a predetermined amount of numbers. In some embodiments, the game can offer a Quick Draw option (the player receives the drawn/winning numbers by tapping on one or more NFC tags on the NFC spot).

In some embodiments, the winning categories could be defined by the amount of numbers revealed by the completion of lines on the table (e.g., for the purposes of the Bingo based example, selection/drawing of up to 20 numbers/spots to form a straight line for a typical Bingo Game.)

In some embodiments, the winner can receive their prize in the same method of their payment or another assigned upon request.

Example 2

Generic Process

In some embodiments, at the beginning of a lottery game NFC-enabled participation, a player can find an NFC-enabled device (SLP/SLS or tag positioned on other location). In some embodiments, the lottery Host can send notification to NFC-enabled devices' users (players or not) when they are close by to a NFC tagged, lottery or other hosts' the lottery is cooperating with, spot. In some embodiments, the notification can include a promotional action, eg. discount on participation, loyalty points redeem, etc.

In some embodiments, the player can move their NFC-enabled device in close proximity to (or tap) one tag on SLP/SLS indicating their desire to participate in the lottery game depicted on the SLP or another game of the Lottery Host.

In some embodiments, in the next step, a lottery Host, including, but not limited to, a lottery terminal, remote lottery processing system, etc, receives the player's request for participation.

In some embodiments, in the next step, the lottery Host conducts history check on the player—if they are registered or not. If registered, the host logs the player into their account, if not transmits participation options.

Figure 3:
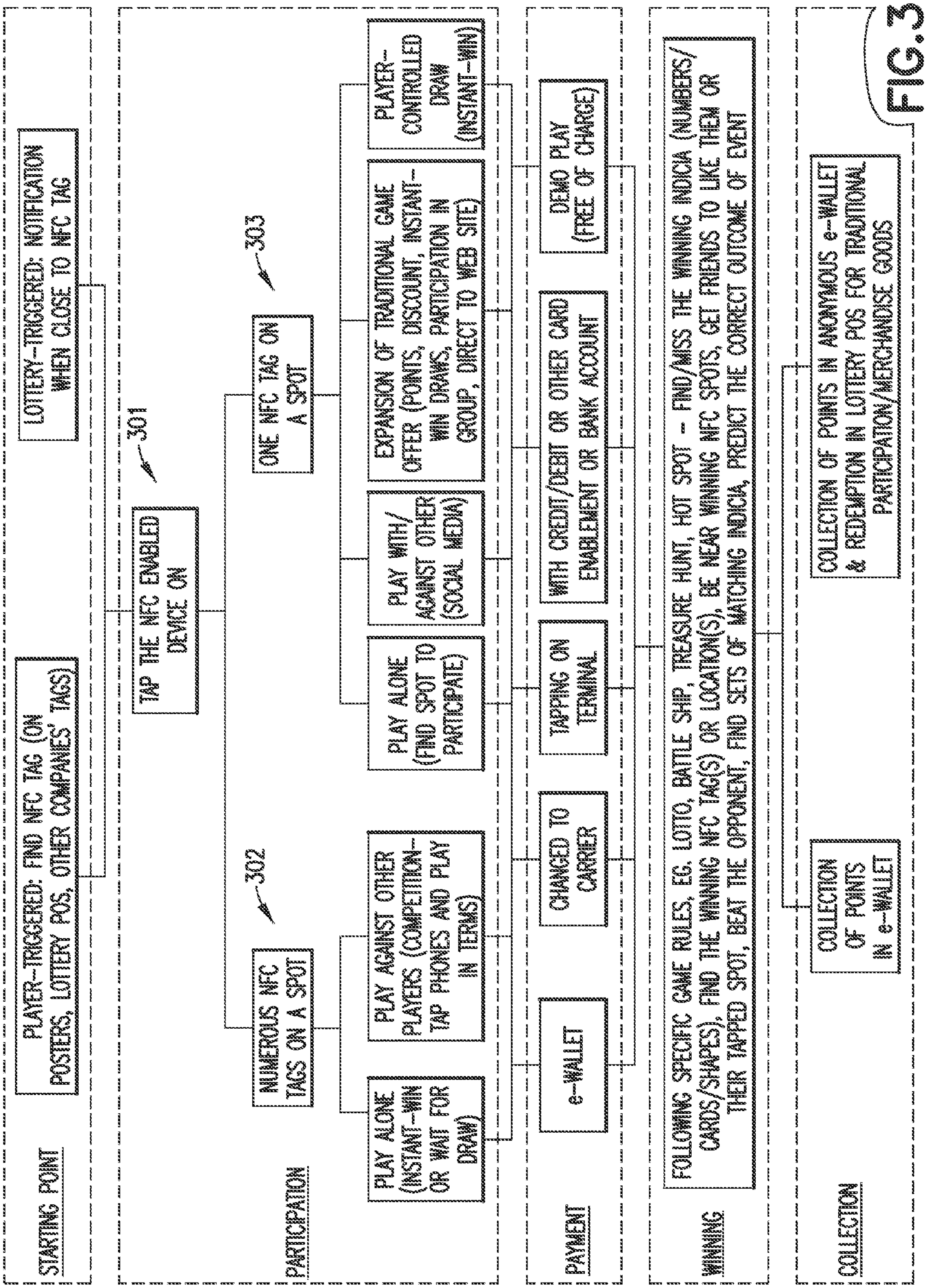
FIG. 3 illustrates another aspects of some embodiments of the instant invention.

As shown in FIG. 3, in some embodiments, in the next step, using NFC-enabled device (e.g., smart phone), the player can make a decision, dependant on game rules (block 301) whether to move their NFC-enabled device in close proximity (or tap):

a) one NFC tag on SLP/SLS (block 302) positioned on one or numerous spots according to specific game rules, and/or b) numerous NFC tags (block 303) on one or numerous SLP/SLS positioned on one or numerous spots according to specific game rules.

In some embodiments, participation may include, but is not limited to, playing alone or with/against others, in one traditional lottery game or an NFC-only game, etc. In some embodiments, the player may need to download a specific application and/or game to be played on their NFC-enabled device.

In some embodiments, participation could be posted on a social media page (player's or lottery Host's or other). In some embodiments, social media posting could be part of the game. In some embodiments, the player may be directed to the lottery Host's website to continue their participation in the game(s) through a website.

In some embodiments, in the next step, the lottery Host receives player's selections.

In some embodiments, in the next step, the lottery Host can transmit representations for the player's taps—indicia, such as, but not limited to, numbers, shapes, colors, puzzle pieces, information, etc. In some embodiments, the indicia could be the ones depicted on the tags with the use of artistic drawing, and/or drawn by the lottery Host randomly on-spot, and/or taken from predetermined pool of results, etc. In some embodiments, when there are more than one indicia, all received indicia can be transmitted to the player for every tap on the selected tag.

In some embodiments, in the next step, the lottery Host can request from the player to validate their entry by, for example, submitting personal information (e.g, bank account, credit card account, social security, driving license, etc,), security information (e.g., password, etc).

In some embodiments, in the next step, the player can validate their selections or start over.

In some embodiments, in the next step, once validated, the lottery Host can transmit payment options, such as, but not limited to, e-wallet, direct charge from credit/debit or other card or personal bank account, charge on the carrier (e.g., AT&T, Vodafone,) tapping on the lottery Host's terminal, redeeming collected loyalty points or free-participation coupon, etc. The game could also be offered without participation cost for a specific player, group of players, time period as a promotional action to drive participation or reward loyal players.

In some embodiments, in the next step, player purchases an entry to play the game.

In some embodiments, in the next step, the lottery Host receives player's purchase.

In some embodiments, in the next step, the lottery Host can log player's purchase.

In some embodiments, in the next step, the lottery Host can conduct security check on player's purchase.

In some embodiments, in the next step, the lottery Host can accept player's purchase.

In some embodiments, in the next step, the lottery Host can conduct or organize the game draw, which can be performed in at least one of the following ways:

a) a regular game draw by random number generator (RNG) or drawing machine or any other result drawing method, b) specific to player, on the time of participation or later, general draw for among a plurality of participations/entries, overall general draw among all game participations/entries, or draw including all possible outcomes of the game, not limited to game participants c) instant, at the exact time of participation or not at the exact time of participation but after a certain period of time from an entry (e.g., day, week, month), d) animated or non-animated, e) having a predetermined or on-spot determined outcome, f) outcome based on a specific geographic area, e.g. where the lottery Host terminal is located, etc, (e.g. Hot Spot style games), g) Progressive Draw: the player can select to participate in one day of the week (e.g., Monday), or other time period, and the draw may take place in stages—one indicia, e.g. number, drawn per day, or other time period—allowing other players to join the player(s) with some winning numbers on a later stage of the week, or other time period, claiming a lesser prize and/or boosting the initial player's jackpot points;

h) the winning result is determined by social media activity, whether player-activated or random, i) player-control draw, thus the player selects the winning indicia by tapping on one or numerous tags on the NFC spot to get results instantly (could apply to e.g., traditional lottery games, Hangman-style games), and/or j) the winning results are determined by a event result (e.g., sport event).

In some embodiments, the Lottery Host may conduct one or more additional draws, in addition to the main game draw, to determined instant-win winners according to one or more secondary indicia transmitted in the process of tag selection as described above.

In some embodiments, in the next step, the lottery Host can determine winners and prizes according to draw results.

In some embodiments, in the next step, the lottery Host can transmit winning result(s) to player(s), along with additional information, such as number of winners, jackpot level, etc.

In some embodiments, in the next step, the player can determine whether they are winner by following one or more game rules, for example, but not limited to:

a) find the winning indicia (e.g., numbers/cards/shapes)

b) miss the winning indicia (e.g., numbers/cards/shapes), c) find the correct NFC tag(s) and/or location(s), d) be in close proximity to winning NFC tag or spot, e.g. physical presence, and/or purchasing an entry in the area, etc e) get friends to like them and/or their tapped spot (e.g., get a certain number of friends to like a café, restaurant, a store), f) beat the opponent, g) find sets of matching indicia, and/or h) predict the correct outcome of one or more events, e.g. a sport event.

In some embodiments, player(s) can follow a specified route (every spot gives instructions/hints/indicia for the next) and win following specific game rules, e.g. the first one to complete the route wins. In some embodiments, player(s) can be entitled to secondary prizes based on additional tasks.

In some embodiments, player(s) can play alone or with the help of peers (e.g., a group to cover the route and share the winnings). Participation with peers could be achieved through the internet site of the Lottery Host or social media pages or by tapping their NFC-enabled device on their co-player or co-players respective devices.

In some embodiments, the Host may pursue alliances with other companies allowing player(s) the opportunity to tap on not only lottery Host's tags but other, non-lottery tags as well (e.g., in the event of a winning entry, the player(s) may tap on the product(s) they wish to receive as prize(s)).

In some embodiments, in the next step, the player receives the respective prize if they are the winner by one or more of the following ways, as specified by the player:

a) e-wallet (points to be translated in monetary prize), b) direct charge in credit/debit or other card, and/or specified bank account, and/or mobile carrier, c) money/points to be redeemed at any store (and/or in specific store(s) with pre-agreement) for, not limiting to, merchandise material, discount, bonus, etc.;

d) participation in another special draw, and/or e) participation in the lottery Host's other game(s).

In some embodiments, a mobile application may need to be installed after taping the starting NFC tag and before proceeding into the game for the first time.

In some embodiments, NFC-enabled smart devices for playing in lottery games can be utilize for:

a) requesting/providing help/assistance, b) informative use, providing unique information that is not available or easily accessible at lottery's POS/internet site or other informative manner, c) expansion of traditional game offer by offering one or more of the following options with a simple tap:

i) awarding points, ii) discount, iii) instant-win draws, iv) group participation, v) reward system for frequent participation, and/or vi) re-direction to Lottery website or game specific micro-site for remote participation.

In some embodiments, NFC-enabled smart devices can be also used as additional identification level for internet participation or payment (e.g., by tapping on the laptop).

Example 3

Lottery Group Play—Lottery Retailer Specific Group (Group Consist of Players Playing within the Same Lottery POS (Point of Service Area)

In some embodiments, the instant invention allows to form lottery playing groups using a variety of means including in certain embodiments mobile electronic device proximity detection, email, social media, mobile messaging, custom web applications, bar codes, q-codes, RFID and BlueTooth technology. In some embodiments, the instant invention allows users to invite others to join groups using a variety of means including in certain embodiments mobile electronic device proximity detection, email, social media, mobile messaging, custom web applications, bar codes, q-codes, RFID and BlueTooth technology.

In some embodiments, once groups are formed, the instant invention provides for a real-time activity tracking at individual and/or group level, drawing activity, behavior and performance data from any of a number of sources including in certain embodiments lottery games data streams, lottery point of sale information and/or player's historical lottery information.

In some embodiments, in one of the initial steps, each of players submits his/her participation in the retail network using their player card or a NFC-enabled mobile device on a NFC-enabled terminal.

In some embodiments, player taps their NFC-enabled mobile device on one tag within the lottery POS (lottery Host) which offers Group Play participation.

In some embodiments, the lottery Host receives player request for a group play participation and enables/downloads a group play mobile application on the mobile device for a group play.

In some embodiments, the player can scan the barcode or other insignia printed from a printed receipt and submit the request to participate in the group lottery game. In other embodiments, entry in one formed group play participation could be achieved by a player by tapping an initial player's (the one that first requested a group participation entry) NFC-enabled device with their own.

In some embodiments, the lottery Host can receives player's request and make/allow the player to participate as member of the group play. In some embodiments, the lottery Host can receives player's request and allow the player to select/organize their group to play in a group lottery game.

In some embodiments, the lottery Host can conduct the draw based on the game specific rules and communicates the winning results with a push notification service to the mobile clients.

In some embodiments, player can receive the won amount and/or share from the group winnings to their, for example, e-wallet base on at least one of the following options, but not limiting to:

a) player wins;
b) another member of group wins;
c) the group as a whole wins; and/or
d) certain number of group members win.

Example 4

Lottery Group Play—Game Specific Group (Group Consist of Players Playing with the Same Lottery Game/Product)

In some embodiments, in one of the initial steps, one or more players find a lottery Game Poster with NFC tags (e.g., SLP/SLS) representing group play participations on specific game (e.g., Keno) with specific number of entries (e.g., 1 . . . 12 for the Keno based example).

In some embodiments, in the next step, each player can tap their NFC-enabled mobile device on one tag to generate a Keno entry, which, for instance may include participation with 1 up to 12 numbers and 1 up to 12 boards for the Keno based example.

In some embodiments, in the next step, the lottery Host can receive the player request for group play participation, enable/download the specific group play mobile application, e.g. for Keno game, on the mobile device of each member of the lottery playing group, and generate the boards prefilled with numbers based on player(s) selection(s).

In some embodiments, in the next step, each player can accept the selection(s) and the mobile app can present a barcode or other insignia that can be used to communicate each player's participation to the lottery retailer terminal (POS). In some embodiments, in the next step, each player can submit their participation in the lottery retail network by scanning the barcode available on the mobile device.

In some embodiments, the lottery Host can conduct the draw based on the game specific rules and communicates the winning results with a push notification service to the mobile clients.

In some embodiments, each player can receive the winning amount (and/or share from the group winnings) to, for example, the e-wallet base on at least one of the following options, but not limiting to:

a) player wins;
b) another member of group wins;
c) the group as a whole wins; and/or
d) certain number of group members win.

Example 5

Conducting and Participating in Treasure Hunt Type Lottery Games

Figure 4:
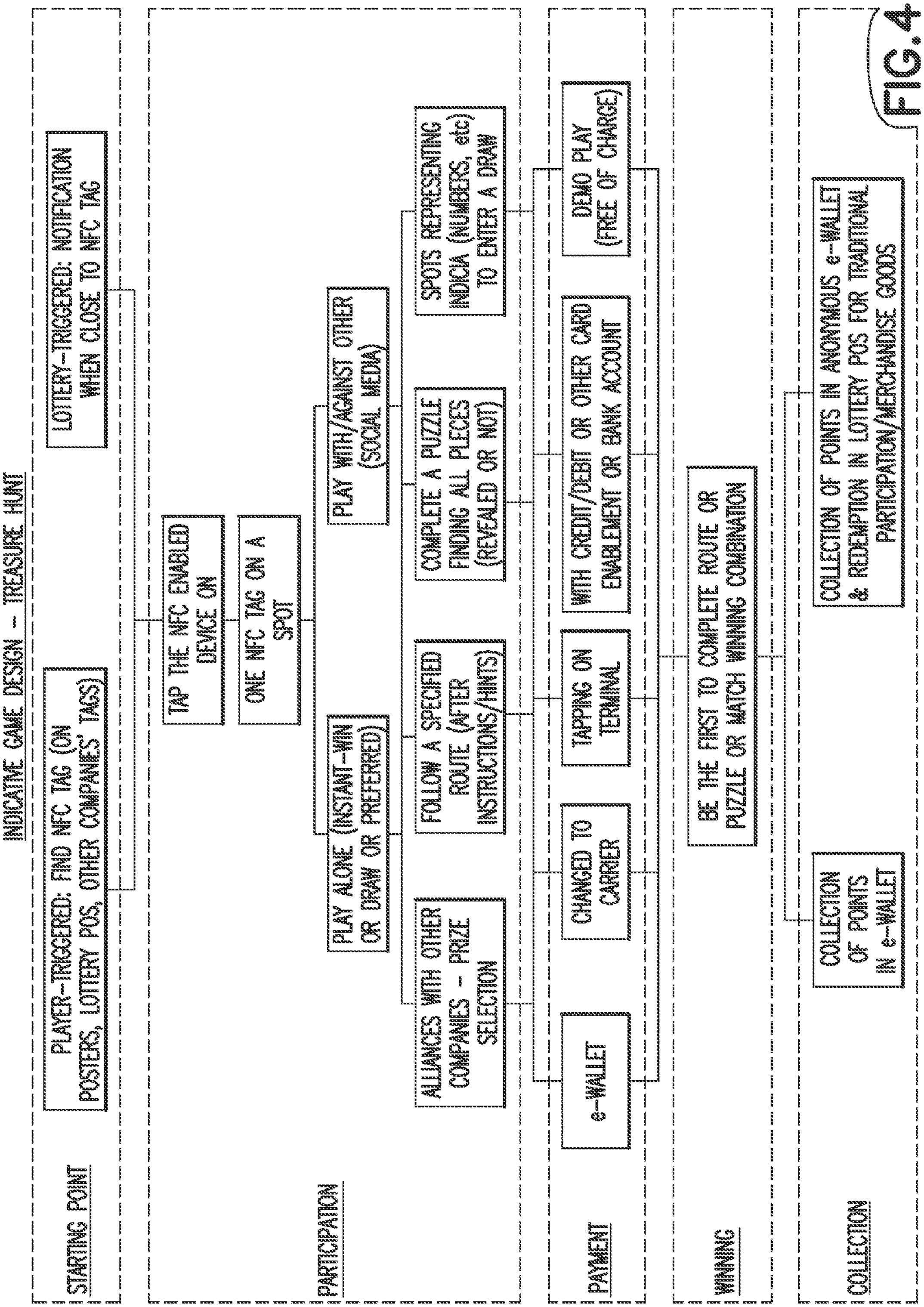
FIG. 4 illustrates yet another aspects of some embodiments of the instant invention.

Some embodiments for conducting and participating in the Treasure Hunt type Lottery Games are performed as shown in FIG. 4.

In some embodiments, in one of the initial steps, one or more players finds (or gets found by) an NFC-enabled device positioned on one or more spots by a lottery Host (e.g., SLP/SLS) or other cooperating hosts.

In some embodiments, in the next step, each player can tap a NFC-enabled mobile device on one tag on the spot to indicate their desire to participate in the game. In some embodiments, the player can access the game by tapping on the notification message they received when approximating the NFC spot or by entering the relevant mobile application if already installed on their devices.

In some embodiments, in the next step, the lottery Host can receive the player request for lottery play participation.

In some embodiments, in the next step, the lottery Host can conduct history check on the player (e.g., if they are registered or not). In some embodiments, in the next step, if registered, the lottery host logs the player into their account, if not transmits participation options: e.g., sign-up to play, provide a payment account, etc. In some embodiments, the player may be offered a free participation entry or a discount on the participation cost as a result of a promotional action for player acquisition or retention.

In some embodiments, in the next step, the player can tap on one or numerous tags on one or numerous spots according to specific game rules. Participation may include, but is not limited to, playing alone or with/against others, etc. In some embodiments, for example, the lottery host can enable the player to post their participation in the lottery game on player's and/or lottery's and/or other social media page or account (e.g., Facebook, twitter, Google+, etc.). In some embodiments, the lottery host can enable the player to form/sign-up more players through the player's and/or lottery's and/or other social media page or account.

In some embodiments, in the next step, the lottery Host can receive the player's selection(s).

In some embodiments, in the next step, the lottery Host can transmit representations for the player's taps—indicia, such as, but not limited to, numbers, shapes, colors, puzzle pieces, information for the next spot on the route, etc. In some embodiments, the indicia could be the ones depicted on the tags with the use of artistic presentation, and/or drawn by lottery Host randomly on-spot, and/or taken from predetermined pool of results. In some embodiments, when there are more than one indicia, all received indicia can be transmitted to the player for every tap on the selected tag.

In some embodiments, for example, the treasure hunt lottery game can be in a form of a puzzle, sequence of indicia (e.g. numbers), etc., that requires from the player(s) to find all pieces:

a) Uncovered: the players may be required to find all the pieces in exact or any order by seeing them displayed with the use of artistic representation on NFC spots to tap and/or download b) Covered: the players may tap on NFC spots with no prior knowledge to which puzzle piece is hidden underneath. The players may be given the choice to exchange repeated pieces with peers with the use of e.g. social media, tapping each other's NFC-enabled devices, etc.

In some embodiments, in the next step, the lottery Host can transmit payment options, such as, but not limited to, e-wallet, direct charge to credit/debit or other card or personal bank account, charge on the carrier (e.g., AT&T, Vodafone,) tapping on the lottery Host's terminal, etc. The game could also be offered without participation cost for a specific player, group of players, time period as a promotional action to drive participation or reward loyal players.

In some embodiments, in the next step, the player purchases an entry to the game.

In some embodiments, in the next step, the lottery Host receives player's purchase.

In some embodiments, in the next step, the lottery Host can log player's purchase.

In some embodiments, in the next step, the lottery Host can accept player's purchase.

In some embodiments, player(s) need to follow a specified route (every spot gives instructions/hints/indicia for the next)—where the player may win following specific game rules, e.g. the first one to complete the route wins. In some embodiments, player(s) can be entitled to secondary prizes based on additional tasks or time needed to complete the designated route or number of required spots they have tapped.

In some embodiments, player(s) can play alone or with help of peers (e.g., a group to cover the route and share the winnings). Participation with peers could be achieved through the internet site of the Lottery Host or social media pages or by tapping their NFC-enabled device on their co-player or co-players respective devices.

In some embodiments, the Host may pursue alliances with other companies allowing player(s) the opportunity to tap at not only lottery Host's tags but other, non-lottery tags as well (e.g., in the event of a winning entry, the player(s) may tap on the product(s) they wish to receive as prize(s)).

In some embodiments, the lottery Host may conduct one or more additional draws to determined instant-win winners according to one or more secondary indicia transmitted in the process of tag selection as described above.

In some embodiments, in the next step, the lottery Host can determine winners and prizes based on the draw results.

In some embodiments, in the next step, the lottery Host can transmit winning result(s) to player(s) as well as other information, such as number of winners, next treasure hunt game time, hints for the next route designed, etc.

In some embodiments, in the next step, the player can determine whether they are winner by following one or more game rules, for example, but not limited to:

a) find the winning indicia (e.g., numbers/cards/shapes)

b) miss the winning indicia (e.g., numbers/cards/shapes), c) find the winning NFC tag(s) and/or location(s), d) be in close proximity to winning NFC tag or spot, e.g. physical presence, and/or purchasing an entry in the area, etc e) complete the designated route before all or some of the rest of the players, f) complete the winning puzzle/indicia order before all or some of the rest of the players, g) get friends to like them and/or their tapped spot(s) (e.g., get a certain number of friends to like a café, restaurant, a store), h) beat the opponent(s), i) find sets of matching indicia, and/or j) predict the correct outcome of one or multiple events, e.g. sport event(s).

In some embodiments, in the next step, player receives prize if they are winner by one or more of the following ways:

a) e-wallet (points to be translated in monetary prize), b) direct charge in credit/debit or other card, and/or specified bank account, and/or mobile carrier, c) money/points to be redeemed at any store (and/or in specific store(s) with pre-agreement) for, not limiting to, merchandise material, discount, bonus, etc.;

d) participation in another special draw, and/or e) free participation in the lottery Host's other game(s).

Example 6

Conducting and Participating in a Lottery Game Based on Being at a Particular Geographic Location (Hot Spot Lottery Games)

Figure 5:
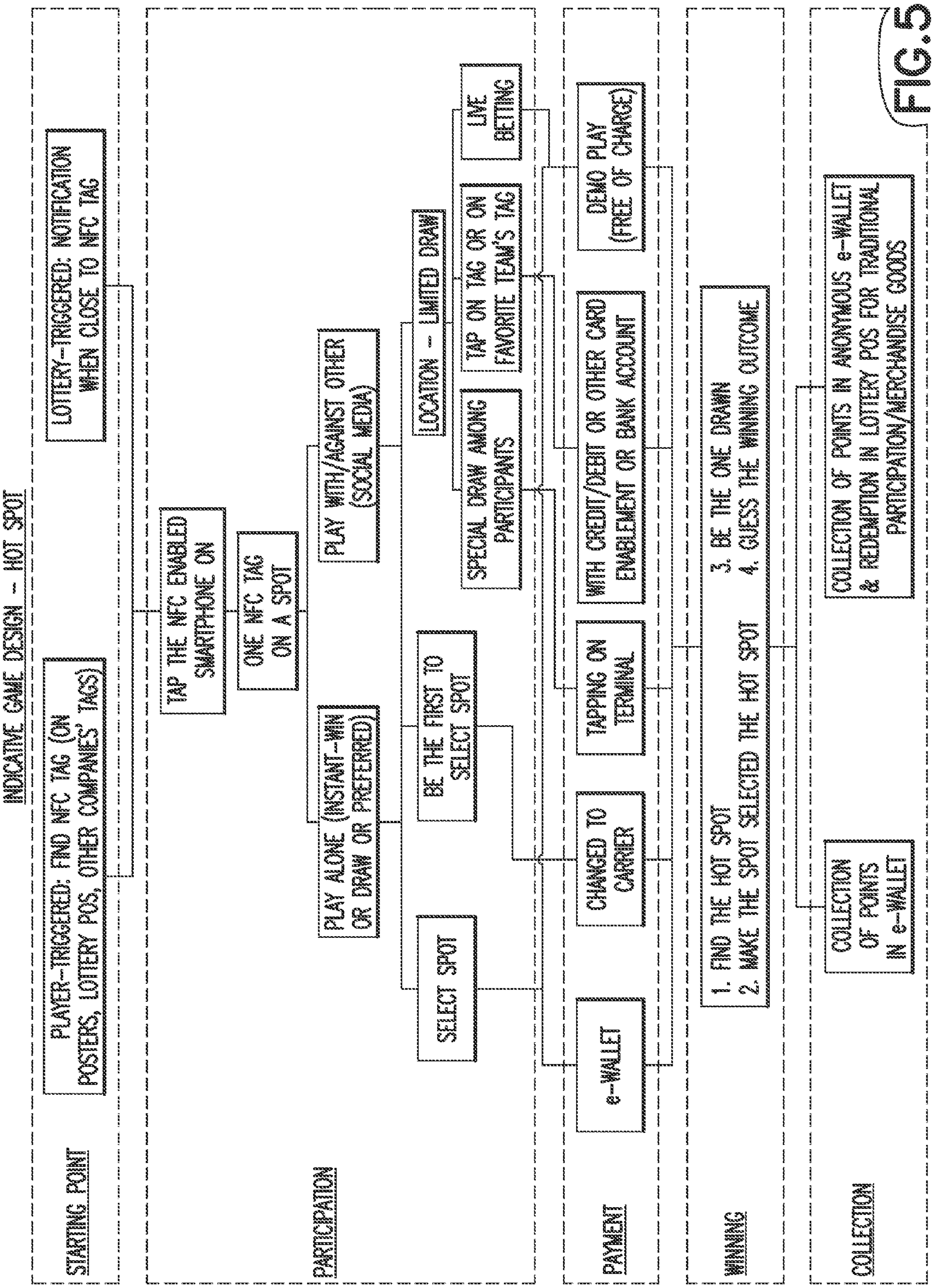
FIG. 5 illustrates further aspects of some embodiments of the instant invention.

Some embodiments for conducting and participating in the Hot Spot Lottery Games are performed as shown in FIG. 5. Some embodiments for conducting and participating in the Hot Spot Lottery Games can include:

a) determining if the NFC spot is a Hot Spot by tapping on a NFC tagged spot and winning if the particular spot is drawn or chosen (e.g. by being the most tapped spot for a predetermined time period (e.g., one day, one week));

b) performing geographic area-centered drawing:

i) all or some players having tapped NFC tags located in the area around the winning Hot Spot may be entitled to a prize as well. In some embodiments, two or more draws may be possible: one daily among players, one weekly among all possible NFC tags (e.g., jackpot);

ii) a participant can "own" a spot by being, e.g. the first to tap it and get points for all others who tap it as well, thus the first player may be entitled to a bigger fraction of the prize;

iii) a draw may be limited to the participants at or near a specific location, e.g. football field, cafeteria, etc, in which the player may participate alone or with others (for additional chances and/or points, e.g. pyramid-making: the first one receives a higher prize then the rest) by e.g. tapping on NFC spot, live betting, pre-event betting (e.g., selection of favorite sport team, etc.), etc; and/or c) engaging peers to visit selected (tapped) spot: a player can tap and/or bet on one or more particular tagged spots and communicate to peers (e.g., friends) to act in a similar way, making it the Hot Spot of the day, or other time period.

In some explanatory embodiments, in one of the initial steps, one or more players find (or gets found by) an NFC-enabled device positioned on a spot from a lottery Host (e.g., SLP/SLS) or other hosts' the lottery is cooperating with. In some embodiments, the notification can include a promotional action, eg. discount on participation, loyalty points redeem, etc.

In some embodiments, in the next step, the lottery Host can receive player request for the lottery play participation.

In some embodiments, in the next step, the lottery Host can conduct history check on the player (e.g., if they are registered or not). In some embodiments, in the next step, if registered, the lottery host logs the player into their account, if not transmits participation options: e.g., sign-up to play, provide a payment account, etc.

In some embodiments, in the next step, the player can tap on one or numerous tags on one or numerous spots according to specific game rules. Participation may include, but is not limited to, playing alone or with/against others, etc. In some embodiments, for example, the lottery host can enable the player to post his or her participation in the lottery game on player's and/or lottery's or other social media page or account (e.g., Facebook, twitter, Google+, etc.). In some embodiments, the lottery host can enable player to form/sign-up more player through player's and/or lottery's and/or other social media page or account.

In some embodiments, in the next step, the lottery Host can receive player's selection(s).

In some embodiments, in the next step, the lottery Host can transmit representations for the player's taps—indicia, such as, but not limited to, numbers, shapes, colors, puzzle pieces, information, etc. In some embodiments, the indicia could be the ones depicted on the tags with the use of artistic representation, and/or drawn by lottery Host randomly on-spot, and/or taken from predetermined pool of results. In some embodiments, when there are more than one indicia, all received indicia can be transmitted to the player for every tap on the selected tag.

In some embodiments, in the next step, the lottery Host can transmit payment options, such as, but not limited to, e-wallet, direct charge from credit/debit or other card or personal bank account, charge on the carrier (e.g., AT&T, Vodafone,) tapping on the lottery Host's terminal, etc. The game could also be offered without participation cost for a specific player, group of players, time period as a promotional action to drive participation or reward loyal players.

In some embodiments, in the next step, player purchases an entry to play the game.

In some embodiments, in the next step, the lottery Host receives player's purchase.

In some embodiments, in the next step, the lottery Host can log player's purchase.

In some embodiments, in the next step, the lottery Host can accept player's purchase.

In some embodiments, in the next step, the lottery Host can conduct or organize the game draw, which can be performed in at least one of the following ways:

a) a regular game draw by random number generator (RNG) or drawing machine or other results drawing device, b) specific to player, general draw for among a plurality of participations/entries but not all of playing participants, overall general draw among all game participations/entries, or draw including all possible outcomes of the game, not limited to game participants, c) instant, at the exact time of participation, or not at the exact time of participation but after a certain period of time from an entry (e.g., day, week, month), d) animated or non-animated, e) having predetermined or on-spot outcome, f) outcome based on a specific geographic area, e.g. where the lottery Host terminal is located, and/or g) the winning result is determined by social media activity, whether player-activated or random.

In some embodiments, the winning results may be determined by one or more event result (e.g., sport event).

In some embodiments, player(s) can play alone or with help of or against peers.

In some embodiments, the Host may pursue alliances with other companies allowing player(s) the opportunity to tap at not only lottery Host's tags but other, non-lottery tags as well (e.g., in the event of a winning entry, the player(s) may tap on the product(s) they wish to receive as prize(s)).

In some embodiments, the lottery Host may conduct one or more additional draws to determined instant-win winners according to one or more secondary indicia transmitted in the process of tag selection as described above.

In some embodiments, in the next step, the player can determine whether they are winner by following one or more game rules, for example, but not limited to:

a) find the winning indicia (e.g., numbers/cards/shapes)

b) miss the winning indicia (e.g., numbers/cards/shapes), c) find the winning NFC tag(s) and/or location(s), d) be in close proximity to winning NFC tag or spot, e.g. physical presence, and/or purchasing an entry in the area, etc e) get friends to like them and/or their tapped spot(s) (e.g., get a certain number of friends to like a café, restaurant, a store), f) beat the opponent, g) find sets of matching indicia, and/or h) predict the correct outcome of one or more events, such as sport events.

In some embodiments, in the next step, the lottery Host can determine winners and prizes.

In some embodiments, in the next step, the lottery Host can transmit winning result(s) to player(s).

In some embodiments, in the next step, the player receives prize if they are winner by one or more of the following ways, as requested or by default:

a) e-wallet (points to be translated in monetary prize), b) direct charge in credit/debit or other card, and/or specified bank account, and/or mobile carrier, c) money/points to be redeemed at any store (and/or in specific store(s) with pre-agreement with the Lottery Host) for, not limiting to, merchandise material, discount rates, bonus, etc.;

d) participation in another special draw, and/or e) free participation in the lottery Host's other game(s).

In some embodiments, the instant invention provides for a computer-implemented method that at least includes the following steps: specifically programming at least one computer system of a game conducting authority to perform at least the following: receiving at least one first indication indicating that at least one first player desires to participate in at least one first lottery game, where the at least one first indication is received based, at least in part on, at least one first near field communication (NFC) between a first mobile device of the at least one first player and at least one first game piece associated with the at least one first lottery game conducted by the game conducting authority; communicating with the first mobile device of the at least one first player to verify an identity of the at least one first player by the game conducting authority; receiving, from the first mobile device of the at least one first player, at least one first payment for playing the at least one first lottery game by the at least one first player;

conducting at least one first drawing by the game conducting authority in accordance with at least one first rule of the at least one first lottery game; receiving at least one second indication identifying at least one first action performed by the at least one first player in accordance with at least one second rule of the at least one first lottery game conducted by the game conducting authority, where the at least one first action is based, at least in part, on: i) a result of the at least one first drawing by the game conducting authority, and ii) at least one second NFC between the first mobile device of the at least one first player and at least one second game piece associated with the at least one first lottery game conducted by the game conducting authority; distributing at least one first prize to the at least one first player in accordance with at least one third rule of the at least one first lottery game; receiving at least one third indication indicating that at least one second player desires to participate in the at least one first lottery game, where the at least one second indication is received based, at least in part on, at least one second NFC between a second mobile device of the at least one second player and at least one third game piece associated with the at least one first lottery game conducted by the game conducting authority; communicating with the second mobile device of the at least one second player to verify an identity of the at least one second player by the game conducting authority; receiving, from the second mobile device of the at least one second player, at least one second payment for playing the at least one first lottery game by the at least one second player; conducting at least one second drawing by the game conducting authority in accordance with the at least one first rule of the at least one first lottery game; receiving at least one forth indication identifying at least one second action performed by the at least one second player in accordance with the at least one second rule of the at least one first lottery game conducted by the game conducting authority, where the at least one second action is based, at least in part, on: i) a result of the at least one second drawing by the game conducting authority, and ii) at least one fourth NFC between the second mobile device of the at least one second player and the at least one fourth game piece associated with the at least one first lottery game conducted by the game conducting authority; and distributing at least one second prize to the at least one second player in accordance with the at least third rule of the at least one first lottery game.

In some embodiments, the at least one first and the at least one second drawings are among a plurality of players of the at least one first lottery game. In some embodiments, the at least one first and the at least one second drawings are the same. In some embodiments, the at least one first and the at least one third game pieces are the same. In some embodiments, the at least one first and the at least one third game pieces are the same. In some embodiments, the at least one second and the at least one fourth game pieces are the same.

In some embodiments, the at least one first lottery games is selected from the group of: a treasure hunt type game, a Hot Spot type game, and a lotto type game.

In some embodiments, the at least one first action performed by the at least one first player and the at least one second action performed by the at least one second player of the player further based on the at least one first player and the at least one second player jointly playing the at least one first lottery games. In some embodiments, the at least one first prize is a first portion of at least one third prize and the at least one second prize is a second portion of the at least one third prize.

In some embodiments, the instant invention provides for a computer-implemented method that at least includes the following steps: specifically programming at least one computer system of a game conducting authority to perform at least the following: receiving at least one first indication indicating that at least one first player desires to participate in at least one first lottery game, where the at least one first indication is received based, at least in part on, at least one first near field communication (NFC) between a first mobile device of the at least one first player and at least one first game piece associated with the at least one first lottery game conducted by the game conducting authority; communicating with the first mobile device of the at least one first player to verify an identity of the at least one first player by the game conducting authority; receiving, from the first mobile device of the at least one first player, at least one first payment for playing the at least one first lottery game by the at least one first player; receiving at least one third indication indicating that at least one second player desires to participate in the at least one first lottery game, where the at least one second indication is received based, at least in part on, at least one second NFC between a second mobile device of the at least one second player and at least one third game piece associated with the at least one first lottery game conducted by the game conducting authority; communicating with the second mobile device of the at least one second player to verify an identity of the at least one second player by the game conducting authority; receiving, from the second mobile device of the at least one second player, at least one second payment for playing the at least one first lottery game by the at least one second player; conducting at least one first drawing by the game conducting authority in accordance with at least one first rule of the at least one first lottery game; receiving at least one second indication identifying at least one first action performed by the at least one first player in accordance with at least one second rule of the at least one first lottery game conducted by the game conducting authority, where the at least one first action is based, at least in part, on: i) a result of the at least one first drawing by the game conducting authority, and ii) at least one second NFC between the first mobile device of the at least one first player and at least one second game piece associated with the at least one first lottery game conducted by the game conducting authority; receiving at least one forth indication identifying at least one second action performed by the at least one second player in accordance with the at least one second rule of the at least one first lottery game conducted by the game conducting authority, where the at least one second action is based, at least in part, on: i) the result of the at least one first drawing by the game conducting authority, and ii) at least one fourth NFC between the second mobile device of the at least one second player and the at least one fourth game piece associated with the at least one first lottery game conducted by the game conducting authority; and distributing at least one first prize to the at least one first player in accordance with at least one third rule of the at least one first lottery game; and distributing at least one second prize to the at least one second player in accordance with the at least third rule of the at least one first lottery game.

In some embodiments, the instant invention provides for a computer system that includes at least the following components: at least one computer having a non-transient computer tangible readable medium having stored thereon software instructions executable by at least one processor of the computer that include at least the following code: code to receive at least one first indication indicating that at least one first player desires to participate in at least one first lottery game, where the at least one first indication is received based, at least in part on, at least one first near field communication (NFC) between a first mobile device of the at least one first player and at least one first game piece associated with the at least one first lottery game conducted by the game conducting authority; code to communicate with the first mobile device of the at least one first player to verify an identity of the at least one first player by the game conducting authority; code to receive, from the first mobile device of the at least one first player, at least one first payment for playing the at least one first lottery game by the at least one first player; code to conduct at least one first drawing by the game conducting authority in accordance with at least one first rule of the at least one first lottery game; code to receive at least one second indication identifying at least one first action performed by the at least one first player in accordance with at least one second rule of the at least one first lottery game conducted by the game conducting authority, where the at least one first action is based, at least in part, on: i) a result of the at least one first drawing by the game conducting authority, and ii) at least one second NFC between the first mobile device of the at least one first player and at least one second game piece associated with the at least one first lottery game conducted by the game conducting authority; code to distribute at least one first prize to the at least one first player in accordance with at least one third rule of the at least one first lottery game; code to receive at least one third indication indicating that at least one second player desires to participate in the at least one first lottery game, where the at least one second indication is received based, at least in part on, at least one second NFC between a second mobile device of the at least one second player and at least one third game piece associated with the at least one first lottery game conducted by the game conducting authority; code to communicate with the second mobile device of the at least one second player to verify an identity of the at least one second player by the game conducting authority; code to receive, from the second mobile device of the at least one second player, at least one second payment for playing the at least one first lottery game by the at least one second player; code to conduct at least one second drawing by the game conducting authority in accordance with the at least one first rule of the at least one first lottery game; code to receive at least one forth indication identifying at least one second action performed by the at least one second player in accordance with the at least one second rule of the at least one first lottery game conducted by the game conducting authority, where the at least one second action is based, at least in part, on: i) a result of the at least one second drawing by the game conducting authority, and ii) at least one fourth NFC between the second mobile device of the at least one second player and the at least one fourth game piece associated with the at least one first lottery game conducted by the game conducting authority; and code to distribute at least one second prize to the at least one second player in accordance with the at least third rule of the at least one first lottery game.

In some embodiments, the instant invention provides for a computer system that includes at least the following components: at least one computer having a non-transient computer tangible readable medium having stored thereon software instructions executable by at least one processor of the computer that include at least the following code: code to receive at least one first indication indicating that at least one first player desires to participate in at least one first lottery game, where the at least one first indication is received based, at least in part on, at least one first near field communication (NFC) between a first mobile device of the at least one first player and at least one first game piece associated with the at least one first lottery game conducted by the game conducting authority; code to communicate with the first mobile device of the at least one first player to verify an identity of the at least one first player by the game conducting authority; code to receive, from the first mobile device of the at least one first player, at least one first payment for playing the at least one first lottery game by the at least one first player; code to receive at least one third indication indicating that at least one second player desires to participate in the at least one first lottery game, where the at least one second indication is received based, at least in part on, at least one second NFC between a second mobile device of the at least one second player and at least one third game piece associated with the at least one first lottery game conducted by the game conducting authority; code to communicate with the second mobile device of the at least one second player to verify an identity of the at least one second player by the game conducting authority; code to receive, from the second mobile device of the at least one second player, at least one second payment for playing the at least one first lottery game by the at least one second player; code to conduct at least one first drawing by the game conducting authority in accordance with at least one first rule of the at least one first lottery game; code to receive at least one second indication identifying at least one first action performed by the at least one first player in accordance with at least one second rule of the at least one first lottery game conducted by the game conducting authority, where the at least one first action is based, at least in part, on: i) a result of the at least one first drawing by the game conducting authority, and ii) at least one second NFC between the first mobile device of the at least one first player and at least one second game piece associated with the at least one first lottery game conducted by the game conducting authority; code to receive at least one forth indication identifying at least one second action performed by the at least one second player in accordance with the at least one second rule of the at least one first lottery game conducted by the game conducting authority, where the at least one second action is based, at least in part, on: i) the result of the at least one first drawing by the game conducting authority, and ii) at least one fourth NFC between the second mobile device of the at least one second player and the at least one fourth game piece associated with the at least one first lottery game conducted by the game conducting authority; and code to distribute at least one first prize to the at least one first player in accordance with at least one third rule of the at least one first lottery game; and code to distribute at least one second prize to the at least one second player in accordance with the at least third rule of the at least one first lottery game.

While a number of embodiments of the present invention have been described, it is understood that these embodiments are illustrative only, and not restrictive, and that many modifications may become apparent to those of ordinary skill in the art.

What is claimed is:

1. A computer-implemented method, comprising:

specifically programming at least one computer system of a game conducting authority to perform at least the following:

receiving at least one first indication indicating that at least one first player desires to participate in at least one first lottery game, wherein the at least one first indication is received based, at least in part, on at least one first near field communication (NFC) between a first mobile device of the at least one first player and at least one first physical game piece associated with the at least one first lottery game conducted by the game conducting authority;

communicating with the first mobile device of the at least one first player to verify an identity of the at least one first player by the game conducting authority;

receiving, from the first mobile device of the at least one first player, at least one first payment for playing the at least one first lottery game by the at least one first player;

conducting at least one first drawing by the game conducting authority in accordance with at least one first rule of the at least one first lottery game;

receiving at least one second indication identifying at least one first action performed by the at least one first player in accordance with at least one second rule of the at least one first lottery game conducted by the game conducting authority, wherein the at least one first action is based, at least in part, on: i) a result of the at least one first drawing by the game conducting authority, and ii) at least one second NFC between the first mobile device of the at least one first player and at least one second physical game piece associated with the at least one first lottery game conducted by the game conducting authority;

distributing at least one first prize to the at least one first player in accordance with at least one third rule of the at least one first lottery game;

receiving at least one third indication indicating that at least one second player desires to participate in the at least one first lottery game, wherein the at least one third indication is received based, at least in part on, at least one third NFC between a second mobile device of the at least one second player and at least one third physical game piece associated with the at least one first lottery game conducted by the game conducting authority;

communicating with the second mobile device of the at least one second player to verify an identity of the at least one second player by the game conducting authority;

receiving, from the second mobile device of the at least one second player, at least one second payment for playing the at least one first lottery game by the at least one second player;

conducting at least one second drawing by the game conducting authority in accordance with the at least one first rule of the at least one first lottery game;

receiving at least one forth indication identifying at least one second action performed by the at least one second player in accordance with the at least one second rule of the at least one first lottery game conducted by the game conducting authority, wherein the at least one second action is based, at least in part, on: i) a result of the at least one second drawing by the game conducting authority, and ii) at least one fourth NFC between the second mobile device of the at least one second player and at least one fourth physical game piece associated with the at least one first lottery game conducted by the game conducting authority; and distributing at least one second prize to the at least one second player in accordance with the at least third rule of the at least one first lottery game.

2. The computer-implemented method of claim 1, wherein the at least one first and the at least one second drawings are among a plurality of players of the at least one first lottery game.

3. The computer-implemented method of claim 1, wherein the at least one first and the at least one second drawings are the same.

4. The computer-implemented method of claim 1, wherein the at least one first and the at least one third physical game pieces are the same.

5. The computer-implemented method of claim 1, wherein the at least one second and the at least one fourth physical game pieces are the same.

6. The computer-implemented method of claim 1, wherein the at least one first lottery game is selected from the group of: a treasure hunt type game, a Hot Spot type game, and a lotto type game.

7. The computer-implemented method of claim 1, wherein the at least one first action performed by the at least one first player and the at least one second action performed by the at least one second player are further based on the at least one first player and the at least one second player jointly playing the at least one first lottery game.

8. The computer-implemented method of claim 1, wherein the at least one first prize is a first portion of at least one third prize and the at least one second prize is a second portion of the at least one third prize.

9. A computer-implemented method, comprising:

specifically programming at least one computer system of a game conducting authority to perform at least the following:

receiving at least one first indication indicating that at least one first player desires to participate in at least one first lottery game, wherein the at least one first indication is received based, at least in part, on at least one first near field communication (NFC) between a first mobile device of the at least one first player and at least one first physical game piece associated with the at least one first lottery game conducted by the game conducting authority;

communicating with the first mobile device of the at least one first player to verify an identity of the at least one first player by the game conducting authority;

receiving, from the first mobile device of the at least one first player, at least one first payment for playing the at least one first lottery game by the at least one first player;

receiving at least one second indication indicating that at least one second player desires to participate in the at least one first lottery game, wherein the at least one second indication is received based, at least in part on, at least one second NFC between a second mobile device of the at least one second player and at least one second physical game piece associated with the at least one first lottery game conducted by the game conducting authority;

communicating with the second mobile device of the at least one second player to verify an identity of the at least one second player by the game conducting authority;

receiving, from the second mobile device of the at least one second player, at least one second payment for playing the at least one first lottery game by the at least one second player;

conducting at least one first drawing by the game conducting authority in accordance with at least one first rule of the at least one first lottery game;

receiving at least one third indication identifying at least one first action performed by the at least one first player in accordance with at least one second rule of the at least one first lottery game conducted by the game conducting authority, wherein the at least one first action is based, at least in part, on: i) a result of the at least one first drawing by the game conducting authority, and ii) at least one third NFC between the first mobile device of the at least one first player and at least one third physical game piece associated with the at least one first lottery game conducted by the game conducting authority;

receiving at least one forth indication identifying at least one second action performed by the at least one second player in accordance with the at least one second rule of the at least one first lottery game conducted by the game conducting authority, wherein the at least one second action is based, at least in part, on: i) the result of the at least one first drawing by the game conducting authority, and ii) at least one fourth NFC between the second mobile device of the at least one second player and at least one fourth physical game piece associated with the at least one first lottery game conducted by the game conducting authority;

distributing at least one first prize to the at least one first player in accordance with at least one third rule of the at least one first lottery game; and distributing at least one second prize to the at least one second player in accordance with the at least one third rule of the at least one first lottery game.

10. The computer-implemented method of claim 9, wherein the at least one first drawing is among a plurality of players of the at least one first lottery game.

11. The computer-implemented method of claim 9, wherein the at least one first and the at least one second physical game pieces are the same.

12. The computer-implemented method of claim 9, wherein the at least one third and the at least one fourth physical game pieces are the same.

13. The computer-implemented method of claim 9, wherein the at least one first action performed by the at least one first player and the at least one second action performed by the at least one second player are further based on the at least one first player and the at least one second player jointly playing the at least one first lottery game.

14. The computer-implemented method of claim 13, wherein the at least one first prize is a first portion of at least one third prize and the at least one second prize is a second portion of the at least one third prize.

15. A computer system, comprising:

at least one computer having a non-transient computer tangible readable medium having stored thereon software instructions executable by at least one processor of the computer, which when executed by the at least one processor of the computer, causes the at least one computer to:

receive at least one first indication indicating that at least one first player desires to participate in at least one first lottery game, wherein the at least one first indication is received based, at least in part, on at least one first near field communication (NFC) between a first mobile device of the at least one first player and at least one first physical game piece associated with the at least one first lottery game conducted by the game conducting authority;

communicate with the first mobile device of the at least one first player to verify an identity of the at least one first player by the game conducting authority;

receive, from the first mobile device of the at least one first player, at least one first payment for playing the at least one first lottery game by the at least one first player;

conduct at least one first drawing by the game conducting authority in accordance with at least one first rule of the at least one first lottery game;

receive at least one second indication identifying at least one first action performed by the at least one first player in accordance with at least one second rule of the at least one first lottery game conducted by the game conducting authority, wherein the at least one first action is based, at least in part, on: i) a result of the at least one first drawing by the game conducting authority, and ii) at least one second NFC between the first mobile device of the at least one first player and at least one second physical game piece associated with the at least one first lottery game conducted by the game conducting authority;

distribute at least one first prize to the at least one first player in accordance with at least one third rule of the at least one first lottery game;

receive at least one third indication indicating that at least one second player desires to participate in the at least one first lottery game, wherein the at least one third indication is received based, at least in part on, at least one third NFC between a second mobile device of the at least one second player and at least one third physical game piece associated with the at least one first lottery game conducted by the game conducting authority;

communicate with the second mobile device of the at least one second player to verify an identity of the at least one second player by the game conducting authority;

receive, from the second mobile device of the at least one second player, at least one second payment for playing the at least one first lottery game by the at least one second player;

conduct at least one second drawing by the game conducting authority in accordance with the at least one first rule of the at least one first lottery game;

receive at least one forth indication identifying at least one second action performed by the at least one second player in accordance with the at least one second rule of the at least one first lottery game conducted by the game conducting authority, wherein the at least one second action is based, at least in part, on: i) a result of the at least one second drawing by the game conducting authority, and ii) at least one fourth NFC between the second mobile device of the at least one second player and at least one fourth physical game piece associated with the at least one first lottery game conducted by the game conducting authority; and distribute at least one second prize to the at least one second player in accordance with the at least third rule of the at least one first lottery game.

16. The computer system of claim 15, wherein the at least one first action performed by the at least one first player and the at least one second action performed by the at least one second player are further based on the at least one first player and the at least one second player jointly playing the at least one first lottery game.

17. The computer system of claim 16, wherein the at least one first prize is a first portion of at least one third prize and the at least one second prize is a second portion of the at least one third prize.

18. A computer system, comprising:

at least one computer having a non-transient computer tangible readable medium having stored thereon software instructions executable by at least one processor of the computer, which when executed by the at least one processor causes the at least one computer to:

receive at least one first indication indicating that at least one first player desires to participate in at least one first lottery game, wherein the at least one first indication is received based, at least in part, on at least one first near field communication (NFC) between a first mobile device of the at least one first player and at least one first physical game piece associated with the at least one first lottery game conducted by the game conducting authority;

communicate with the first mobile device of the at least one first player to verify an identity of the at least one first player by the game conducting authority;

receive, from the first mobile device of the at least one first player, at least one first payment for playing the at least one first lottery game by the at least one first player;

receive at least one second indication indicating that at least one second player desires to participate in the at least one first lottery game, wherein the at least one second indication is received based, at least in part on, at least one second NFC between a second mobile device of the at least one second player and at least one second physical game piece associated with the at least one first lottery game conducted by the game conducting authority;

communicate with the second mobile device of the at least one second player to verify an identity of the at least one second player by the game conducting authority;

receive, from the second mobile device of the at least one second player, at least one second payment for playing the at least one first lottery game by the at least one second player;

conduct at least one first drawing by the game conducting authority in accordance with at least one first rule of the at least one first lottery game;

receive at least one third indication identifying at least one first action performed by the at least one first player in accordance with at least one second rule of the at least one first lottery game conducted by the game conducting authority, wherein the at least one first action is based, at least in part, on: i) a result of the at least one first drawing by the game conducting authority, and ii) at least one third NFC between the first mobile device of the at least one first player and at least one third physical game piece associated with the at least one first lottery game conducted by the game conducting authority;

receive at least one forth indication identifying at least one second action performed by the at least one second player in accordance with the at least one second rule of the at least one first lottery game conducted by the game conducting authority, wherein the at least one second action is based, at least in part, on: i) the result of the at least one first drawing by the game conducting authority, and ii) at least one fourth NFC between the second mobile device of the at least one second player and at least one fourth physical game piece associated with the at least one first lottery game conducted by the game conducting authority;

distribute at least one first prize to the at least one first player in accordance with at least one third rule of the at least one first lottery game; and distribute at least one second prize to the at least one second player in accordance with the at least one third rule of the at least one first lottery game.

19. The computer system of claim 18, wherein the at least one first action performed by the at least one first player and the at least one second action performed by the at least one second player are further based on the at least one first player and the at least one second player jointly playing the at least one first lottery game.

20. The computer system of claim 19, wherein the at least one first prize is a first portion of at least one third prize and the at least one second prize is a second portion of the at least one third prize.

* * * * *